(12) United States Patent
Kuwayama et al.

(10) Patent No.: US 9,127,766 B2
(45) Date of Patent: Sep. 8, 2015

(54) BICYCLE DERAILLEUR

(71) Applicant: Shimano Inc., Sakai, Osaka (JP)

(72) Inventors: Kazuya Kuwayama, Osaka (JP);
Atsuhiro Emura, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 451 days.

(21) Appl. No.: 13/671,076

(22) Filed: Nov. 7, 2012

(65) Prior Publication Data

US 2014/0128189 A1 May 8, 2014

(51) Int. Cl.
*F16H 63/30* (2006.01)
*B62M 9/1342* (2010.01)
*B62M 9/132* (2010.01)

(52) U.S. Cl.
CPC ............... *F16H 63/30* (2013.01); *B62M 9/132* (2013.01); *B62M 9/1342* (2013.01)

(58) Field of Classification Search
CPC ............................ B62M 9/1342; B62M 25/08
USPC ........................................................ 474/80, 82
See application file for complete search history.

(56) References Cited

U.S. PATENT DOCUMENTS

| | | | | |
|---|---|---|---|---|
| 4,226,130 A * | 10/1980 | Isobe | | 474/82 |
| 4,500,302 A * | 2/1985 | Crepin | | 474/82 |
| 5,816,966 A * | 10/1998 | Yang et al. | | 474/82 |
| 6,282,976 B1 * | 9/2001 | Jordan et al. | | 74/489 |
| 6,471,610 B1 * | 10/2002 | Tseng et al. | | 474/80 |
| 7,341,532 B2 | 3/2008 | Ichida et al. | | |
| 7,704,173 B2 | 4/2010 | Ichida et al. | | |
| 7,722,487 B2 | 5/2010 | Ichida et al. | | |
| 2008/0300076 A1* | 12/2008 | Fukushima et al. | | 474/80 |
| 2010/0075788 A1* | 3/2010 | Wickliffe et al. | | 474/80 |

* cited by examiner

*Primary Examiner* — Sang Kim
*Assistant Examiner* — Michael Riegelman
(74) *Attorney, Agent, or Firm* — Global IP Counselors (57) ABSTRACT

A bicycle derailleur is basically provided with a base member, a movable member and a connecting structure. The base member includes a bicycle mounting portion. The movable member is movable with respect to the base member between a first position and a second position that is farther than the first position from the base member. The connecting structure movably connects the movable member to the base member. The connecting structure moves the movable member with an actuation ratio that descends and then ascends as the movable member moves from the first position towards the second position.

20 Claims, 6 Drawing Sheets

BICYCLE DERAILLEUR

BACKGROUND

1. Field of the Invention

This invention generally relates to a bicycle derailleur. More specifically, the present invention relates to a bicycle derailleur having a linkage arrangement operatively disposed between a base member and a movable member that regulates an actuation ratio for shifting the movable member.

2. Background Information

Generally, a front derailleur is mounted to the bicycle frame adjacent to the front chain rings to shift a chain laterally between the front chain rings. A front derailleur includes a fixed or base member that is non-movably secured to the bicycle frame. A front derailleur further includes a movable member or chain guide that is movably supported relative to the fixed member such that the movable member moves between at least two lateral shift positions to shift the chain between the front chain rings. Typically, a linkage assembly is coupled between the fixed member and the movable member in order to movably support the movable member. The movable member typically has a pair of cage plates or guide plates arranged to selectively contact and move the chain between the front chain rings. Every derailleur has an "actuation ratio" or "shift ratio" which refers to the ratio between a movement amount of an actuation element, e.g. a cable or a shaft of a motor and a transverse travel amount of the movable member.

SUMMARY

Generally, the present disclosure is directed to an actuation ratio of a bicycle derailleur. in one feature, a bicycle derailleur is provided such that an actuation ratio descends and then ascends as the movable member moves from the first position towards the second position.

In view of the state of the known technology, a bicycle derailleur is provided that basically comprises a base member, a movable member and a connecting structure. The base member includes a bicycle mounting portion. The movable member is movable with respect to the base member between a first position and a second position that is farther than the first position from the base member. The connecting structure movably connects the movable member to the base member. The connecting structure moves the movable member with an actuation ratio that descends and then ascends as the movable member moves from the first position towards the second position.

Other objects, features, aspects and advantages of the disclosed bicycle derailleur will become apparent to those skilled in the art from the following detailed description, which, taken in conjunction with the annexed drawings, discloses a preferred embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
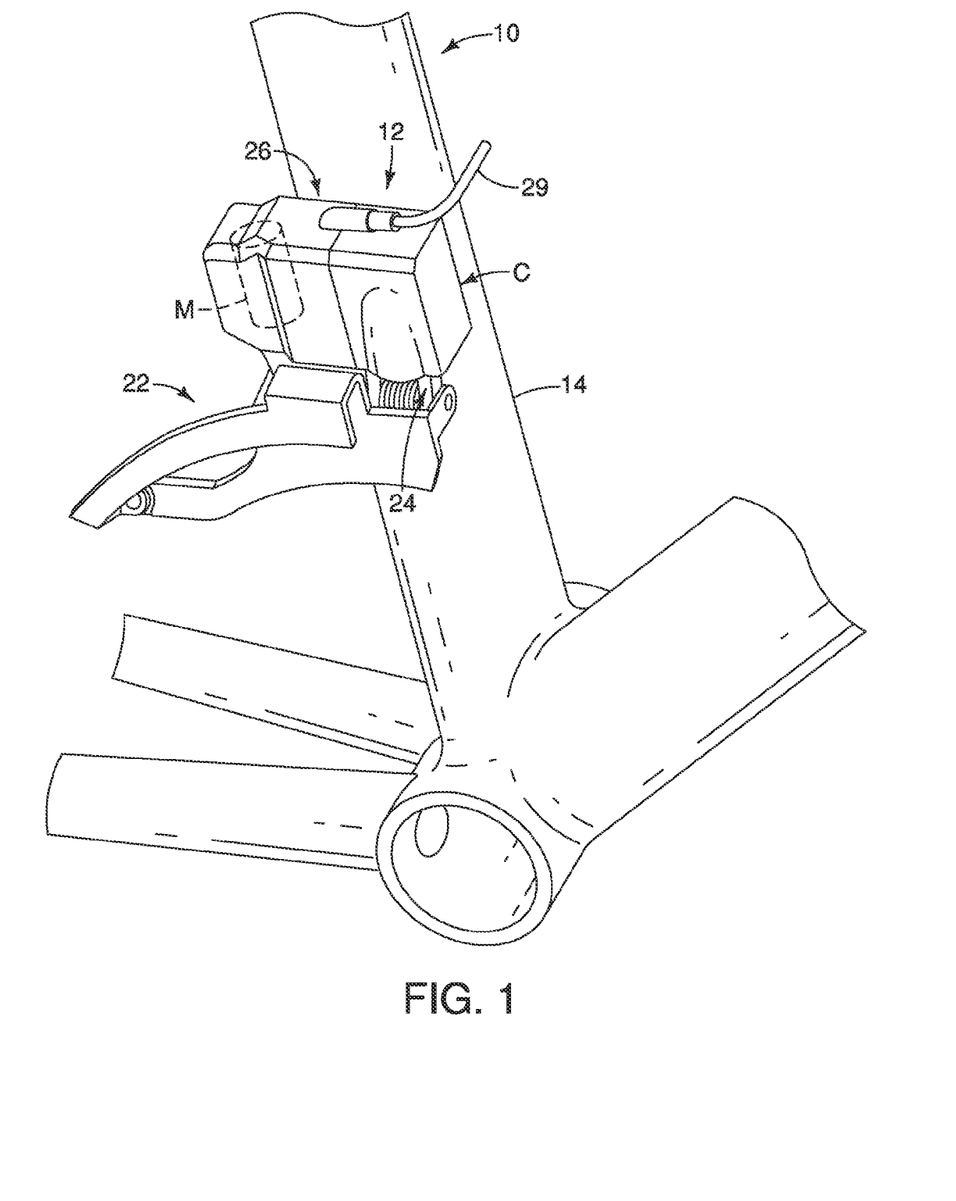
FIG. 1 is a partial side perspective view of a bicycle frame that is equipped with a bicycle derailleur in accordance with one embodiment.
Figure 2:
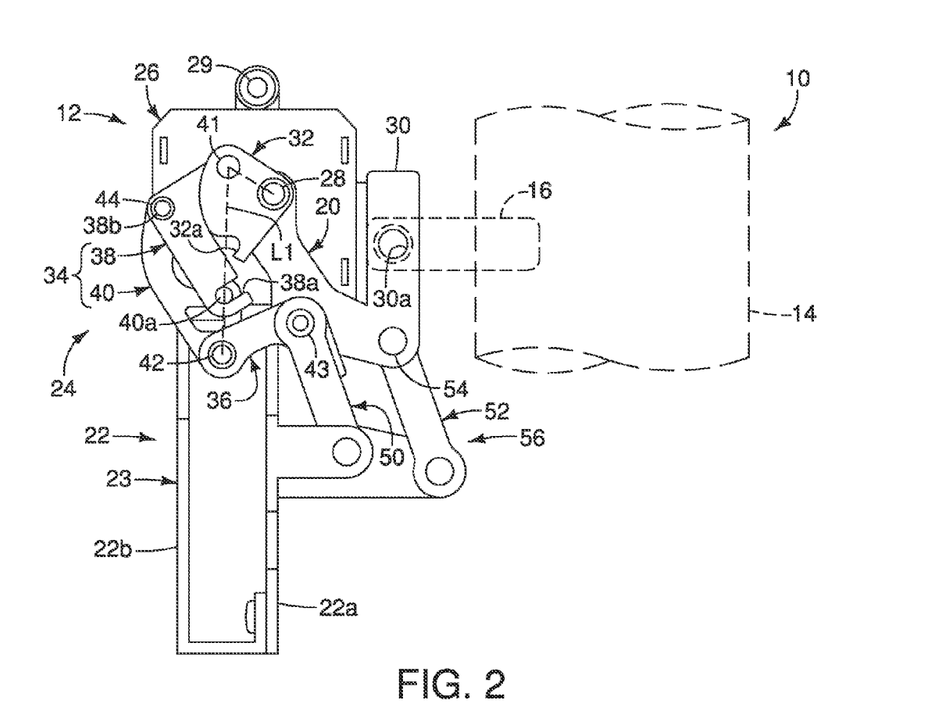
FIG. 2 is a front elevational view of the bicycle derailleur illustrated in FIG. 1 with the cover of the housing of the electric driving unit removed and the movable member in the low position (i.e., the fully retracted position)

Referring initially to FIGS. 1 and 2, a portion of a bicycle frame 10 is illustrated with a bicycle derailleur 12 in accordance with a first embodiment. The bicycle derailleur 12 of the illustrated embodiment is a front derailleur that is mounted to a seat tube 14 of the bicycle frame 10 by a conventional braze-on hanger 16 that is fixed to the seat tube 14, Of course, other types of mounting arrangements, e.g. a band type, can be used as needed and/or desired.

Still referring to FIGS. 1 and 2, the derailleur 12 basically includes a base member 20, a movable member or chain guide 22 (hereinafter "chain guide 22") and a connecting structure 24, which interconnects the base member 20 and the chain guide 22 together. In FIG. 1, the connecting structure 24 is partially concealed by a cover C. In the illustrated embodiment, the derailleur 12 further includes an electric driving unit 26 with an electric reversible motor M therein as seen in FIG. 1. The cover C is secured to the housing of the electric driving unit 26 by a plurality of snap-fitted connections or by other suitable fasteners such as screws.

The electric driving unit 26 is operatively connected to the connecting structure 24 such that the electric driving unit 26 drives the connecting structure 24 so as to move the chain guide 22 relative to the base member 20. In particular, as seen in FIG. 2, the electric driving unit 26 has an output shaft 28 that constitutes an input member, which is connected to the connecting structure 24 such that the electric driving unit 26 drives the connecting structure 24 to move the chain guide 22 relative to the base member 20. An electrical cord 29 of the motor M is connected to a battery (not shown) and/or a generator (not shown). Preferably, a gear reduction unit (not shown) is provided between the motor M and the output shaft 28. Since gear reduction units are commonly used in electric derailleurs, the gear reduction unit of the electric driving unit 26 will not be discussed and/or illustrated herein. While the derailleur 12 is illustrated as an electric front derailleur, the connecting structure 24 can be operated by a cable with minor modifications. In other words, the electric driving unit 26 can be replaces with a cable operated arrangement.

As seen in FIG. 2, the base member 20 includes a bicycle mounting portion 30. The bicycle mounting portion 30 has a threaded hole 30a that receives a mounting bolt (not shown) for attaching the derailleur 12 to the seat tube 14 by the braze-on hanger 16 in a conventional manner. The base member 20 constitutes a fixed member, since the base member 20 is fixed relative to the seat tube 14.

Figure 10:
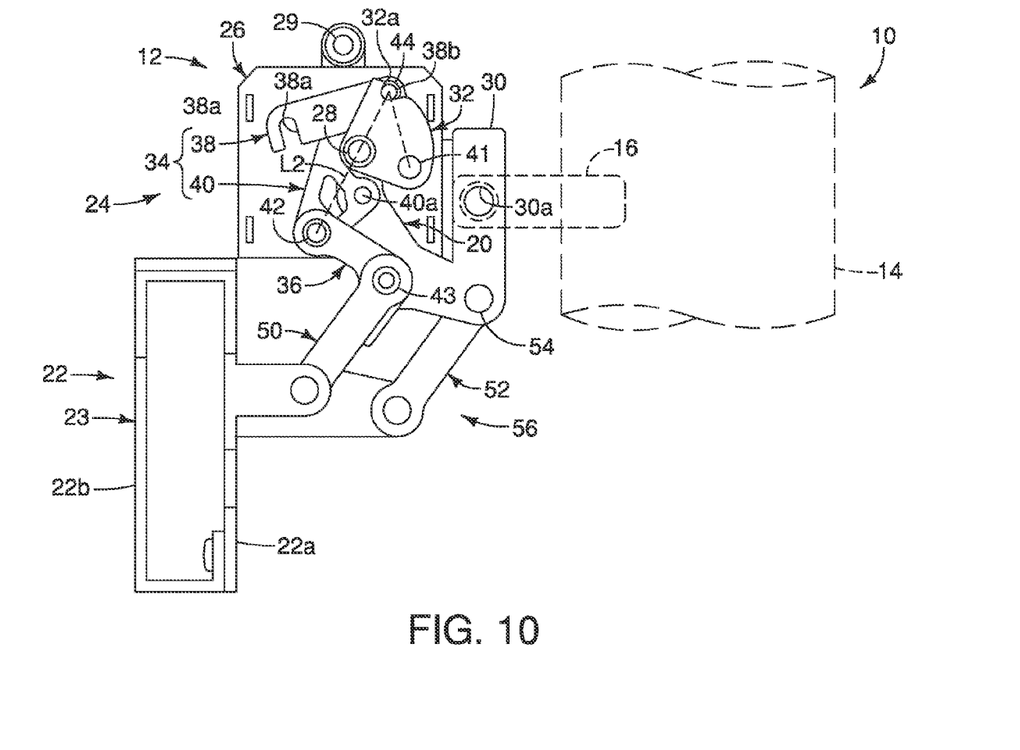
FIG. 10 is a front elevational view of the bicycle derailleur illustrated in FIG. 1 with the movable member in the top position (i.e., the fully extended position)

As seen in FIGS. 2, 4, 6, 8 and 10, the chain guide 22 is movable with respect to the base member 20 between a first position as seen in FIG. 2 and a second position as seen in FIG. 10. The second position of the chain guide 22 is farther than the first position of the chain guide 22 from the base member 20 in a lateral direction with respect to a vertical center longitudinal plane of the bicycle 10. In the illustrated embodiment, the first position of the chain guide 22 corresponds to a low position (i.e., the fully retracted position) of the derailleur 12. On the other hand, in the illustrated embodiment, the second position of the chain guide 22 corresponds to a top position (i.e., the fully extended position) of the derailleur 12. The derailleur 12 is designed to be used with a bicycle that has three front sprockets. Thus, the chain guide 22 is movable with respect to the base member 20 to an intermediate or middle position between the first and second positions as seen in FIG. 7.

The chain guide 22 includes an inner plate 22a and an outer plate 22b. The inner plate 22a and the outer plate 22b are laterally spaced apart and connected to each other at upper and lower end portions to define a chain cage 23. The chain cage 23 of the chain guide 22 defines a chain receiving slot therein. The inner plate 22a pushes a chain up onto a larger sprocket during an upshift operation. The outer plate 22b pulls a chain inward onto a smaller sprocket during a downshift operation.

As mentioned above, the connecting structure 24 movably connects the chain guide 22 to the base member 20 between the first and second positions. Here, the connecting structure 24 basically includes a driving link 32, a connecting link 34 and a driven link 36. The driving link 32 is fixedly mounted to the output shaft 28 (i.e., the input member) such that the driving link 32 rotates together with the output shaft 28. Thus, the driving link 32 is rotatably arranged on the base member 20 by the output shaft 28. The connecting link 34 connects the driving link 32 and the driven link 36. The driven link 36 is operatively coupled to the chain guide 22.

Preferably, the connecting link 34 includes a first arm 38 and a second arm 40. The first arm 38 includes a first slot 38a. The second arm 40 includes a first switching pin 40a that selectively engages the first slot 38a as the chain guide 22 moves between the first and second positions. The first arm 38 includes a second switching pin 38b that selectively engages a second slot 32a of the driving link 32 as the chain guide 22 moves between the first and second positions. The second switching pin 38b is disposed along the pivot axis defined by the fourth pivot shaft 44. In particular, the switching pin 38b is an extension of the fourth pivot shaft 44. As discussed below, this arrangement of the switching pins 38b and 40a and the slot 32a and 38a provides for an actuation ratio that descends and then ascends as the chain guide 22 moves from the first position towards the second position.

The connecting link 34 is pivotally connected to the driving link 32 by a first pivot shaft 41, and is further pivotally connected to the driven link 36 by a second pivot shaft 42. More specifically, the first arm 38 is pivotally connected to the driving link 32 by the first pivot shaft 41, and the second arm 40 is pivotally connected to the driven link 36 by the second pivot shaft 42. The driven link 36 is pivotally connected to the base member 20 by a third pivot shaft 43. The first arm 38 and the second arm 40 are pivotally connected to each other by the fourth pivot shaft 44.

In the illustrated embodiment, the connecting structure 24 further includes a first support link 50 and a second support link 52. The first support link 50 has a first end pivotally attached to the base member 20 and a second end pivotally mounted to the chain guide 22. The second support link 52 has a third end pivotally attached to the base member 20 and a fourth end pivotally mounted to the chain guide 22. As seen in FIG. 2, according to this connection of the first and second support links 50 and 52, the base member 20 and the chain guide 22, a four-bar linkage 56 is defined. The driven link 36 is fixedly coupled to the first support link 50. However, the driven link 36 can be coupled to the second support link 52. Thus, the driven link 36 is coupled to one of the first and second support links 50 and 52. Since the first support link 50 is closer to the chain guide 22 than the second support link 52, the first support link 50 is more preferably fixedly coupled with the driven link 36. The first support link 50 is pivotally connected to the base member 20 by the third pivot shaft 43. The second support link 52 is pivotally connected to the base member 20 by a pivot shaft 54.

Figure 4:
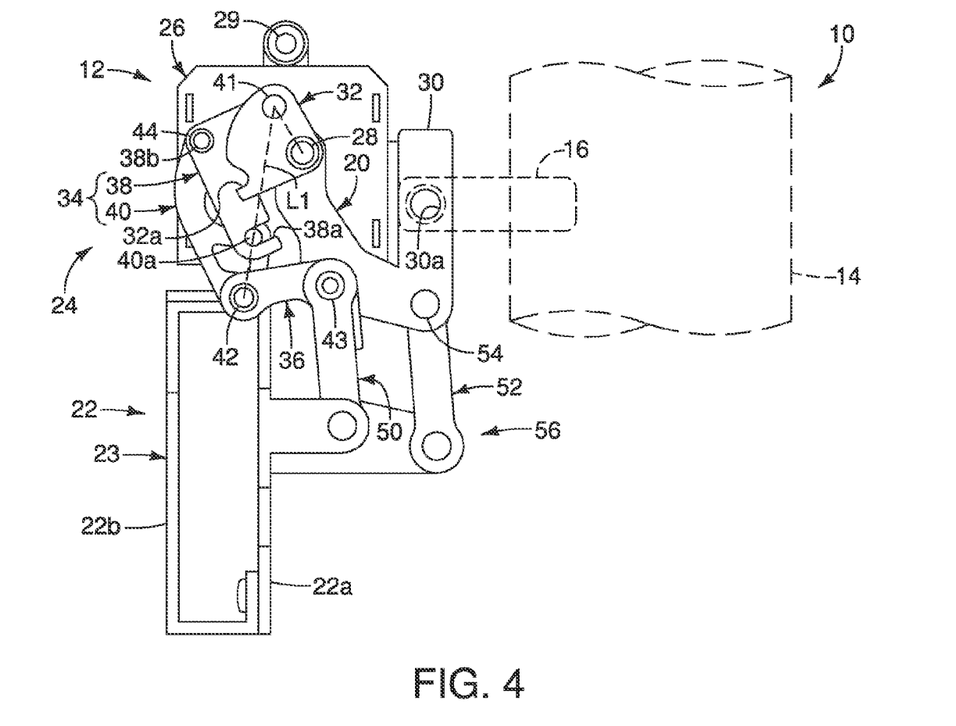
FIG. 4 is a front elevational view of the bicycle derailleur illustrated in FIG. 1 with the movable member in between the low position and the middle position.
Figure 6:
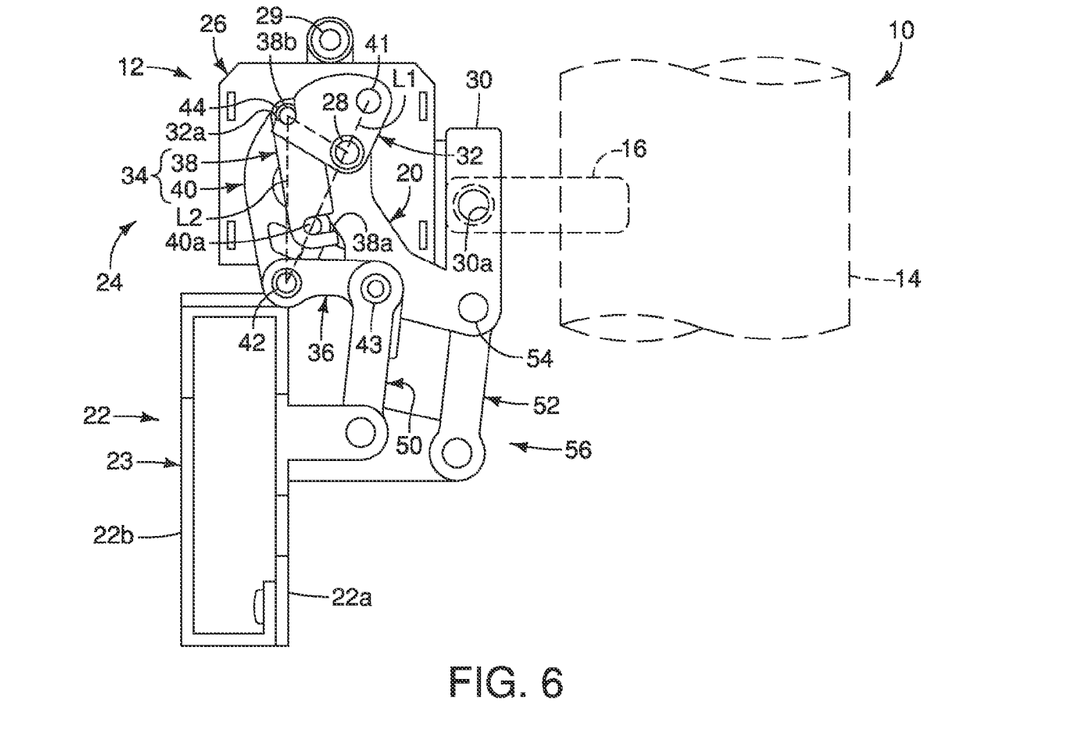
FIG. 6 is a front elevational view of the bicycle derailleur illustrated in FIG. 1 with the movable member in the middle position.
Figure 7:
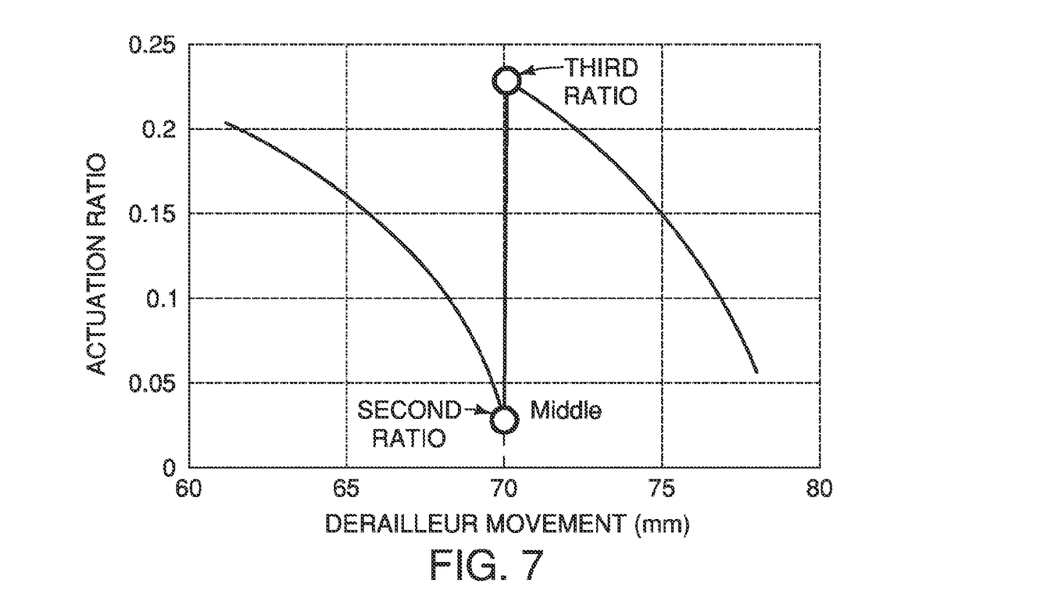
FIG. 7 is a graph plotting the actuation ratio with respect to the transverse movement of the movable member of the bicycle derailleur illustrated in FIG. 1, wherein the movable member is in the middle position.
Figure 8:
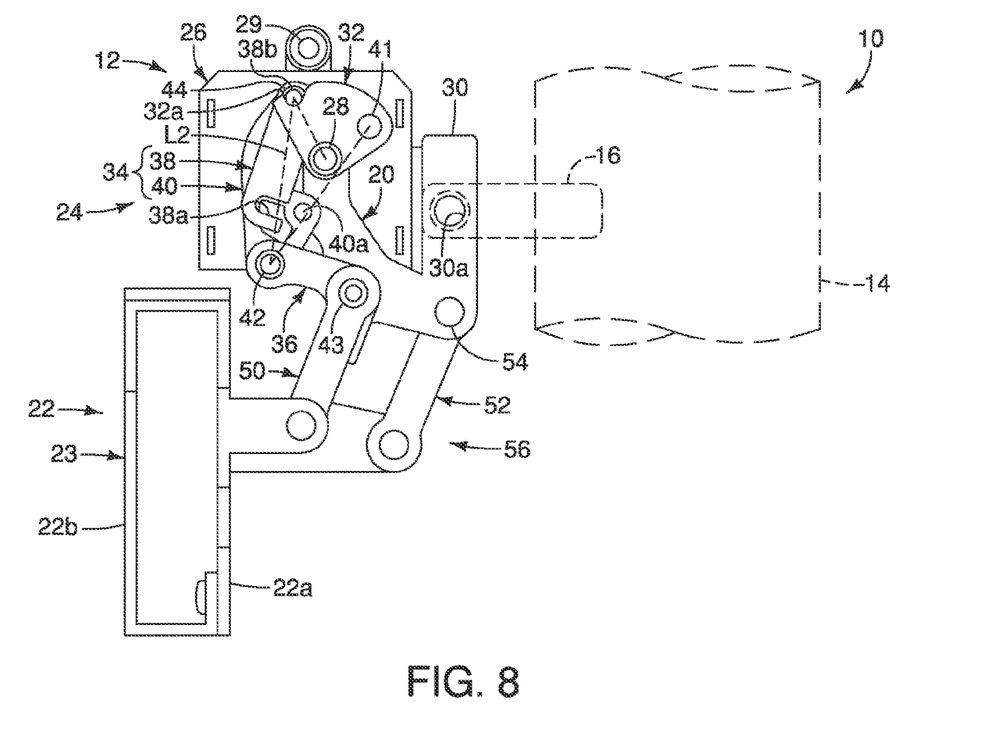
FIG. 8 is a front elevational view of the bicycle derailleur illustrated in FIG. 1 with the movable member in between the middle position and the top position.

Basically, as seen in FIGS. 2, 4 and 6, the connecting link 34 has a first effective length L1 as the chain guide 22 moves from the first position toward the intermediate position. As seen in FIGS. 6, 8 and 10, the connecting link 34 has a second effective length L2 as the chain guide 22 moves from the intermediate position toward the second position. The first effective length L1 of the connecting link 34 is greater than the second effective length 12 of the connecting link 34.

More specifically, the first switching pin 40a is engaged with the first slot 38a to form a first output arm as the chain guide 22 moves from the first position toward the intermediate position. The first output arm extends from the center of the first pivot shaft 41 to the center of the second pivot shaft 42, and has the first effective length L1. The first switching pin 40a is disposed closer to the second pivot shaft 42 than the fourth pivot shaft 44. The second switching pin 38b is engaged with the second slot 32a to form a second output arm as the chain guide 22 moves from the intermediate position toward the second position. The second output arm extends from the center of the fourth pivot shaft 44 to the center of the second pivot shaft 42, and has the second effective length L2.

Figure 3:
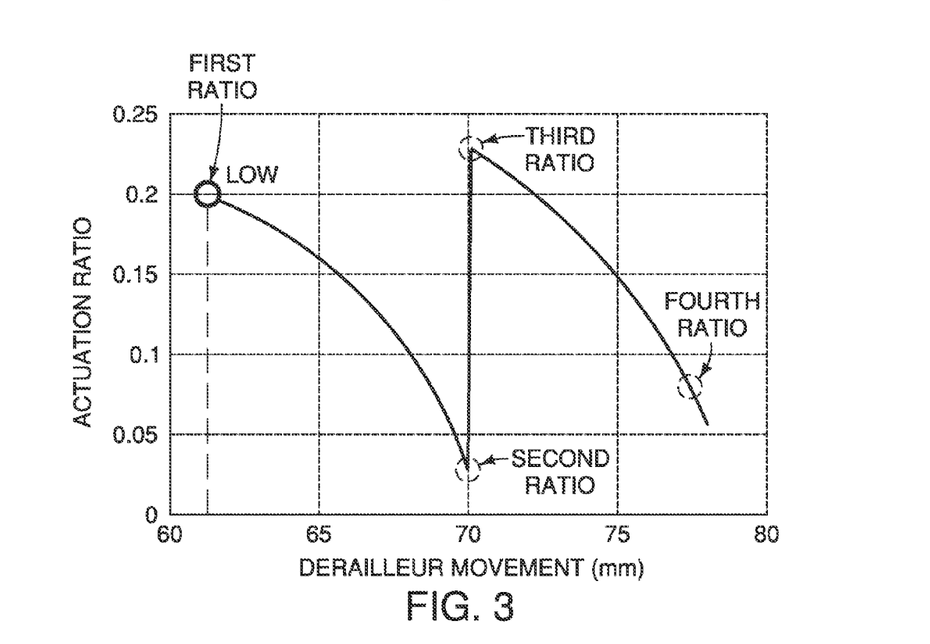
FIG. 3 is a graph plotting the actuation ratio with respect to the transverse movement of the movable member of the bicycle derailleur illustrated in FIG. 1, wherein the movable member is in the low position.
Figure 5:
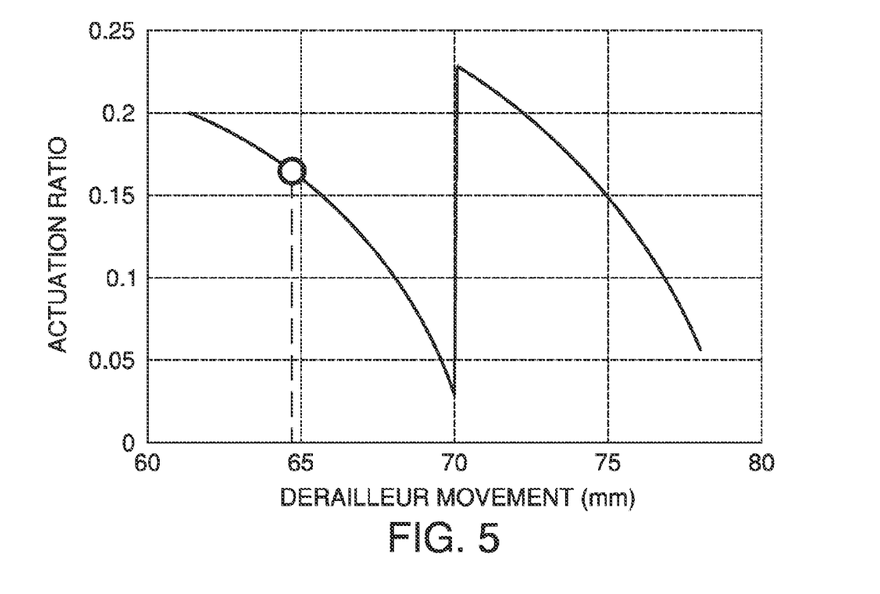
FIG. 5 is a graph plotting the actuation ratio with respect to the transverse movement of the movable member of the bicycle derailleur illustrated in FIG. 1, wherein the movable member is in between the low position and the middle position.
Figure 9:
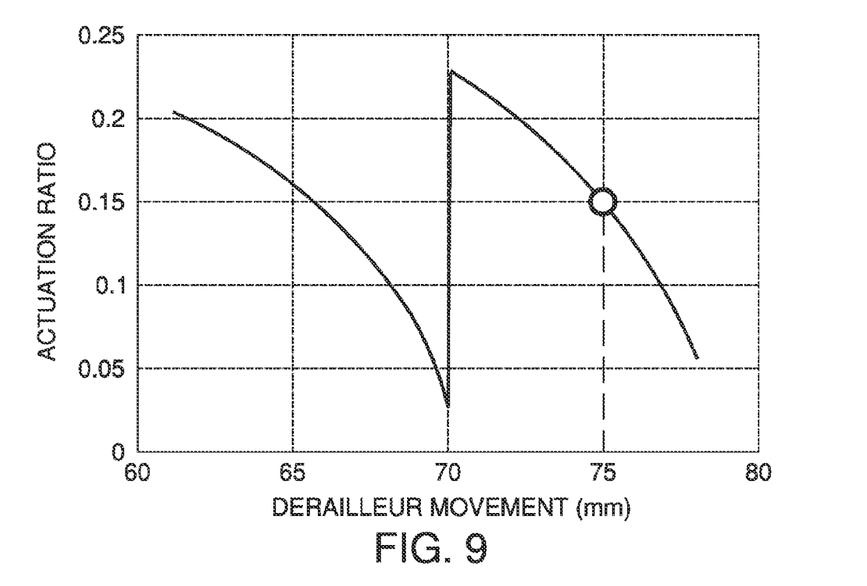
FIG. 9 is a graph plotting the actuation ratio with respect to the transverse movement of the movable member of the bicycle derailleur illustrated in FIG. 1, wherein the movable member is in between the middle position and the top position.
Figure 11:
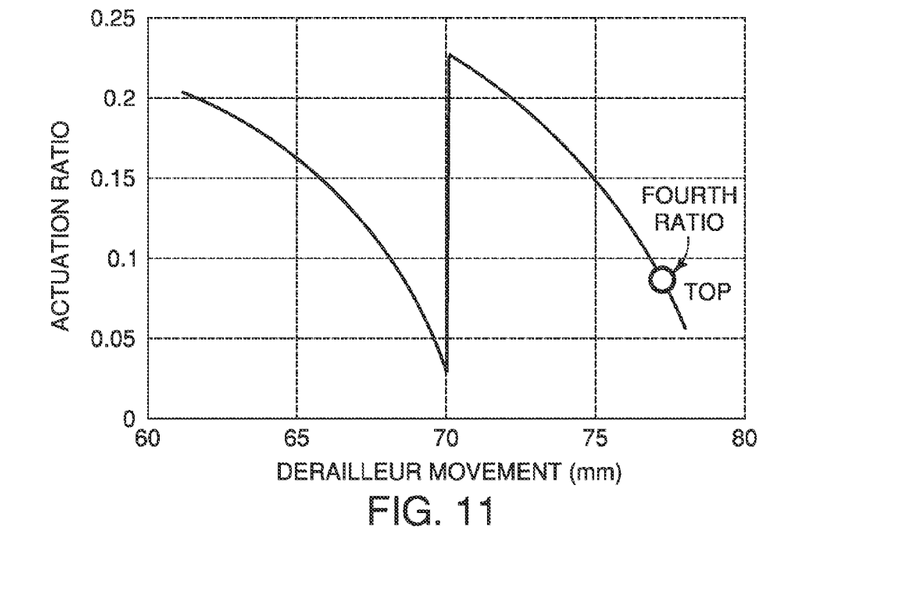
FIG. 11 is a graph plotting the actuation ratio with respect to the transverse movement of the movable member of the bicycle derailleur illustrated in FIG. 1, wherein the movable member is in the top position.

As seen in the graphs of FIGS. 3, 5, 7, 9 and 11, with this arrangement of the connecting structure 24, the connecting structure 24 moves the chain guide 22 with an actuation ratio that descends and then ascends as the chain guide 22 moves from the first position (i.e., the fully retracted position) towards the second position (i.e., the fully extended position). As illustrated in FIG. 3, the actuation ratio changes in order of a first ratio, a second ratio being smaller than the first ratio, and a third ratio being greater than the second ratio, as the chain guides 22 moves from the first position (FIG. 3) towards the second position (FIG. 11). In this way, the actuation ratio descends from the first ratio to the second ratio as seen in FIGS. 3, 5 and 7, and then ascends from the second ratio to the third ratio as seen in FIG. 7. The actuation ratio is switched from the second ratio to the third ratio at an intermediate position between the first position (e.g., the "LOW" position) and the second position (e.g., the "TOP" position) when the first switching pin 40a is disengaging from the first slot 38a and the second switching pin 38b is engaging with the second slot 32a. Preferably, the intermediate position is adjacent to a midpoint between the first position and the second position, but could be at other positions. Lastly, as seen in FIGS. 7, 9 and 11, the actuation ratio descends from the third to a fourth ratio that is smaller than the third ratio as the chain guide 22 moves from the first position towards the second position. In the illustrated embodiment, the first and third ratios are more than twice the second ratio, and the first and third ratios are more than twice the fourth ratio.

In performing a chain shifting operation, the motor M is operated by a user operating device (not shown) to turn the output shaft 28 (i.e., the input member of the connecting structure 24) of the electric driving unit 26. Depending on the rotational direction of the output shaft 28, the connecting structure 24 will either move the chain guide 22 towards or away from the seat tube 14 of the bicycle 10. When the chain guide 22 is in the first position (e.g., the fully retracted position), the output shaft 28 will rotate in a clockwise direction as seen in FIGS. 2, 4, 6, 8 and 10 to move the chain guide 22 towards the second position. Thus, the driving link 32 will also rotate with the output shaft 28 in the clockwise direction as seen in FIGS. 2, 4, 6, 8 and 10. In the first position, the first switching pin 40a is engaged with the first slot 38a and the second switching pin 38b is disengaged from the second slot 32a. Thus, the first and second arms 38 and 40 are connected together as a rigid unit to form the first output arm with the first effective length L1. With the first switching pin 40a is engaged with the first slot 38a, the driven link 36 and the first and second support links 50 and 52 are moved by the connecting structure 24 with the first output arm acting between the first pivot shaft 41 and the second pivot shaft 42.

However, as the output shaft 28 continues to rotate the driving link 32 in the clockwise direction, the second slot 32a of the driving link 32 will eventually hook onto the second switching pin 38b of the fourth pivot shaft 44. As the second slot 32a hooks onto the second switching pin 38b, the first switching pin 40a begins to disengage from the first slot 38a. This results in the first and second arms 38 and 40 being connected together as a rigid unit to form the second output arm with the second effective length L2. In other words, the connecting structure 24 switches from the first output arm. to the second output arm. With the second slot 32a engaged with the second switching pin 38b, the driven link 36 and the first and second support links 50 and 52 are moved by the connecting structure 24 with the second output arm acting between the fourth pivot shaft 44 and the second pivot shaft 42.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention.

The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
   a base member including a bicycle mounting portion;
   a movable member being movable with respect to the base member between a first position and a second position that is farther than the first position from the base member; and
   a connecting structure movably connecting the movable member to the base member, the connecting structure being configured to be connected to an actuation element, the connecting structure moving the movable member with an actuation ratio that decreases and then increases as the movable member moves from the first position towards the second position, the actuation ratio being a movement amount of the movable member with respect to the base member per displacement amount of the actuation element.

2. The bicycle derailleur according to claim 1, wherein the actuation ratio changes in order from a first ratio to a second ratio and from the second ratio to a third ratio as the movable member moves from the first position towards the second position, the second ratio being smaller than the first ratio and the third ratio being greater than the second ratio.

3. The bicycle derailleur according to claim 2, wherein the first and third ratios are more than twice the second ratio.

4. The bicycle derailleur according to claim 2, wherein the actuation ratio is switched from the second ratio to the third ratio at an intermediate position between the first position and the second position.

5. The bicycle derailleur according to claim 4, wherein the intermediate position is adjacent to a midpoint between the first position and the second position.

6. The bicycle derailleur according to claim 4, wherein the connecting structure includes a driving link, a connecting link and a driven link, the driven link is operatively coupled to the movable member, the connecting link is pivotally connected to the driving link about a first pivot axis as the movable member moves from the first position toward the intermediate position and about a second pivot axis different from the first pivot axis as the movable member moves from the intermediate position toward the second position, the connecting link is pivotally connected to the driven link about a third pivot axis, the connecting link has a first effective length as the movable member moves from the first position toward the intermediate position, and the connecting link has a second effective length as the movable member moves from the intermediate position toward the second position, the first effective length being a distance from the first pivot axis to the third pivot axis and the second effective length being a distance from the second pivot axis to the third pivot axis.

7. The bicycle derailleur according to claim 6, wherein the first effective length of the connecting link is greater than the second effective length of the connecting link.

8. The bicycle derailleur according to claim 6, wherein the driving link is mounted to an input member rotatably arranged on the base member such that the driving link rotates together with the input member, the connecting link is pivotally connected to the driving link by a first pivot shaft and is pivotally connected to the driven link by a second pivot shaft, and the driven link is pivotally connected to the base member by a third pivot shaft.

9. The bicycle derailleur according to claim 8, wherein the connecting link includes a first arm pivotally connected to the driving link by the first pivot shaft, and a second arm pivotally connected to the driven link by the second pivot shaft, the first arm and the second arm are pivotally connected to each other by a fourth pivot shaft.

10. The bicycle derailleur according to claim 9, wherein the first arm includes a first slot, the second arm includes a first switching pin, the driving link includes a second slot, the first arm includes a second switching pin, the first switching pin is engaged with the first slot to form a first output arm as the movable member moves from the first position toward the intermediate position, and the second switching pin is engaged with the second slot to form a second output arm as the movable member moves from the intermediate position toward the second position.

11. The bicycle derailleur according to claim 10, wherein the first output arm has the first effective length, the second output arm has the second effective length, the first effective length is greater than the second effective length.

12. The bicycle derailleur according to claim 10, wherein the first switching pin is disposed closer to the second pivot shaft than the fourth pivot shaft.

13. The bicycle derailleur according to claim 12, wherein the second switching pin is disposed along the pivot axis defined by the fourth pivot shaft.

14. The bicycle derailleur according to claim 8, further comprising an electric driving unit having the input member.

15. The bicycle derailleur according to claim 6, wherein the connecting structure further includes a first support link and a second support link, the first and second support links have first ends pivotally attached to the base member and second ends pivotally mounted to the movable member to define a four-bar linkage, and the driven link is coupled to one of the first and second support links.

16. The bicycle derailleur according to claim 15, wherein the first support link is closer to the movable member than the second support link and is coupled with the driven link.

17. The bicycle derailleur according to claim 16, wherein the driving link is mounted to an input member rotatably arranged on the base member such that the driving link rotates together with the input member, the connecting link is pivotally connected to the driving link by a first pivot shaft and is pivotally connected to the driven link by a second pivot shaft, and the driven link is pivotally connected to the base member by a third pivot shaft, the first support link is pivotally connected to the base member by the third pivot shaft.

18. The bicycle derailleur according to claim 2, wherein the actuation ratio further changes from the third to a fourth ratio that is smaller than the third ratio as the movable member moves from the first position towards the second position.

19. The bicycle derailleur according to claim 18, wherein the first and third ratios are more than twice the second ratio, and the first and third ratios are more than twice the fourth ratio.

20. The bicycle derailleur according to claim 1, further comprising an electric driving unit operatively connected to the connecting structure such that the electric driving unit drives the connecting structure so as to move the movable member between the first position and the second position.

* * * * *